US007536428B2

(12) United States Patent
Erdogan et al.

(10) Patent No.: US 7,536,428 B2
(45) Date of Patent: May 19, 2009

(54) CONCURRENT READ AND WRITE ACCESS TO A LINKED LIST WHERE WRITE PROCESS UPDATES THE LINKED LIST BY SWAPPING UPDATED VERSION OF THE LINKED LIST WITH INTERNAL LIST

(75) Inventors: Tahsin Erdogan, Redmond, WA (US); Adrian Marinescu, Issaquah, WA (US); Dragos C. Sambotin, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 278 days.

(21) Appl. No.: 11/585,741

(22) Filed: Oct. 23, 2006

(65) Prior Publication Data
US 2008/0010308 A1     Jan. 10, 2008

Related U.S. Application Data

(60) Provisional application No. 60/816,294, filed on Jun. 23, 2006.

(51) Int. Cl.
G06F 17/30 (2006.01)
G06F 17/00 (2006.01)
G06F 13/00 (2006.01)
(52) U.S. Cl. ............... 707/206; 707/1; 707/8; 707/102; 711/142
(58) Field of Classification Search .......... 707/1, 707/8, 100, 102, 103 Z, 206; 711/144, 156, 711/150, 152, 147, 142; 717/108, 116, 149; 714/11
See application file for complete search history.

(56) References Cited

U.S. PATENT DOCUMENTS 5,924,098 A * 7/1999 Kluge .................. 707/100
5,950,191 A * 9/1999 Schwartz ................. 707/3

(Continued)

FOREIGN PATENT DOCUMENTS

WO     WO 98/28940     * 7/1998

(Continued)

OTHER PUBLICATIONS

Ma.urice Herlihy, "A Methodology for Implementing Highly Concurrent Data Structures", 1990 ACM, pp. 197-206.*

(Continued)

Primary Examiner—Srirama Channavajjala
(74) Attorney, Agent, or Firm—Wolf, Greenfield & Sacks, P.C.

(57) ABSTRACT

A method and computing device for providing concurrent read and write access to a linked list of elements is presented. A linked list is provided wherein read access by a reader process and write access by a writer process may occur substantially concurrently. The linked list includes three internal lists for processes to reference elements of the linked list. The linked list also includes an updated indicator. Read access to the linked list is provided to a reader process such that the reader process accesses elements in the linked list according to a read list of the three internal lists. Write access to the linked list is provided to a writer process such that the writer process accesses elements in the linked list according to a write list of the three internal lists.

12 Claims, 15 Drawing Sheets

U.S. PATENT DOCUMENTS

| | | | |
|---|---|---|---|
| 6,304,924 B1* | 10/2001 | Varma | 710/52 |
| 6,496,907 B1* | 12/2002 | James | 711/159 |
| 6,504,768 B1* | 1/2003 | Roohparvar et al. | 365/200 |
| 6,581,063 B1* | 6/2003 | Kirkman | 707/100 |
| 6,651,146 B1* | 11/2003 | Srinivas et al. | 711/150 |
| 6,826,583 B1* | 11/2004 | Flood et al. | 707/206 |
| 6,892,290 B2* | 5/2005 | Van Doren | 711/168 |
| 6,941,308 B1* | 9/2005 | Chilton | 707/100 |
| 7,117,502 B1* | 10/2006 | Harris | 719/315 |
| 7,308,448 B1* | 12/2007 | Martin et al. | 707/8 |
| 7,328,316 B2* | 2/2008 | Moir et al. | 711/150 |
| 2001/0047361 A1* | 11/2001 | Martin et al. | 707/103 R |
| 2005/0114289 A1* | 5/2005 | Fair | 707/1 |

FOREIGN PATENT DOCUMENTS

| | | | |
|---|---|---|---|
| WO | WO 03/060686 | * | 7/2003 |
| WO | WO 2004/077219 | * | 9/2004 |
| WO | WO 2007/049284 | * | 5/2007 |

OTHER PUBLICATIONS

Martin Sulzmann et al. "Comparing the performance of concurrent linked-list implementations in Haskell", DAMP 09, 10 pages.*

* cited by examiner

CONCURRENT READ AND WRITE ACCESS TO A LINKED LIST WHERE WRITE PROCESS UPDATES THE LINKED LIST BY SWAPPING UPDATED VERSION OF THE LINKED LIST WITH INTERNAL LIST

CROSS-REFERENCE TO RELATED APPLICATION

This application claims the benefit of the filing date of U.S. Provisional Application No. 60/816,294, filed Jun. 23, 2006, the subject matter of which is incorporated herein by reference.

BACKGROUND

Lists are common data structures to keep related data/items together. Lists are also fundamental building blocks used to implement other data structures, such as stacks, queues, and the like. While there are numerous operations that may be implemented with regard to a list, updating the arrangement or configuration of a list can be distilled down to two basic actions: adding an item to the list and deleting an item from the list.

When a process has exclusive access to a list, adding or deleting a list item is relatively straightforward. However, multi-process access to a list is unwieldy because a list can only reasonably be added to by a single process at any given time. More particularly, when a first process gains write access in order to update a list, all other access to the list by other processes is excluded, i.e., a second process is not allowed to read or write to the list. Of course, while read access will not modify the list, it must still be restricted during a write operation as the read operation may encounter inconsistent/wrong results while the write operation is in progress.

In fact, many computer operating systems, server software, and user applications make extensive use of linked lists in such varied settings as memory management/allocation, file systems, library management, and the like. Thus, as is appreciated by those skilled in the art, in many (if not all) of these settings, the lists may be accessed by more than one concurrently executing process. Unfortunately, until now, even in a multi-process/multi-tasking system, when one process is writing to a list, all other access to that list by other processes is blocked. Moreover, this blockage can seriously impact the overall performance of the computer system.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method for providing concurrent read and write access to a linked list of elements, suitable for execution on a computing device having a processor and a memory, is presented. The method comprises each of the following steps. A linked list is provided. The linked list includes three internal lists and an updated indicator. The three internal lists are for referencing elements of the linked list. Read access to the linked list is provided to a reader process. Read access is provided such that the reader process reads elements in the linked list via a read list of the three internal lists. Write access to the linked list is provided to a writer process. Write access is provided to the writer process such that the writer process updates elements in the linked list via a write list of the three internal lists. The read access by the reader process and the write access by the writer process may occur substantially concurrently.

A computing device supporting a linked list providing substantially concurrent read and write access is provided. The computing device comprises a processor, a memory, an operating system, and an executable module executing on the computing device. The executable module, when executing on the computing device, configures the computing device to perform the following. A linked list, including three internal lists for referencing elements of the linked list, is provided. An updated indicator for indicating whether a swap list of the three internal lists is updated and ready for swapping with a read list of the three internal lists is also provided. Read access to the linked list is provided to a reader process such that the reader process accesses elements in the linked list according to the read list. Write access to the linked list is provided to a writer process such that the writer process accesses elements in the linked list according to a write list of the three internal lists.

A tangible computer-readable medium bearing computer-executable instructions is presented. When executed on a computing device comprising a processor and a memory, the computer-executable instructions carry out a method for providing a linked list supporting substantially concurrent read and write access. The method comprises substantially the following steps. A linked list is provided, the linked list including three internal lists and an updated indicator. The three internal lists are for referencing elements of the linked list. Read access to the linked list is provided to a reader process such that the reader process reads elements in the linked list via a read list of the three internal lists. Write access to the linked list is provided to a writer process such that the writer process updates elements in the linked list via a write list of the three internal lists. The read access by the reader process and the write access by the writer process may occur substantially concurrently.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

As a preliminary matter, while the following discussion is made in terms of read and write processes having access to a linked list, the use of the term "process" should be viewed as a general term indicating an execution context that is identifiable from other contexts, such as having its own virtual address space. Accordingly, under some operating system configurations, the current usage of the term "process" may actually refer to a "thread," where the thread has an execution context, has a virtual address space, and is distinguishable from other threads.

Rather than simply relying upon present practices of mutually exclusive access when writing to a linked list and reading from a linked list, a linked list supporting substantially concurrent read and write operations is presented. According to the present disclosure, a Reader process (i.e., a process that has read access to the linked list) gets a snapshot of the elements/nodes of the linked list at the time read access is requested. This snapshot remains unaffected even though a Writer process (i.e., a process that has write access to the linked list) gains write access and writes to the same linked list. Updates made to the linked list by the Writer process while the Reader process has read access to the linked list are finalized after the Reader process releases access to the list. As will be described below, the Reader process is immune from any inconsistencies that can and do arise as a result of reading list elements that are subject to modification by the Writer process concurrently writing to the elements in the linked list. Beneficially, neither the Reader process nor the Writer process is blocked by each other's concurrent access to the linked list.

The following set forth a list of basic guides, at least some of which enable a linked list to support substantially concurrent read and write access to its elements by a Reader and Writer process, respectively:

A Writer process updates the entire linked list, at least upon exit, if there is no concurrent Reader access;

A Reader process can swap the read list with a swap list when the swap list is marked as updated and ready for swapping;

A Writer process updates the write list and the swap list when there is a concurrent Reader process; and A Writer process queues pending operations for the read list when it cannot complete an update on the read list due to Reader access.

Figure 1A:
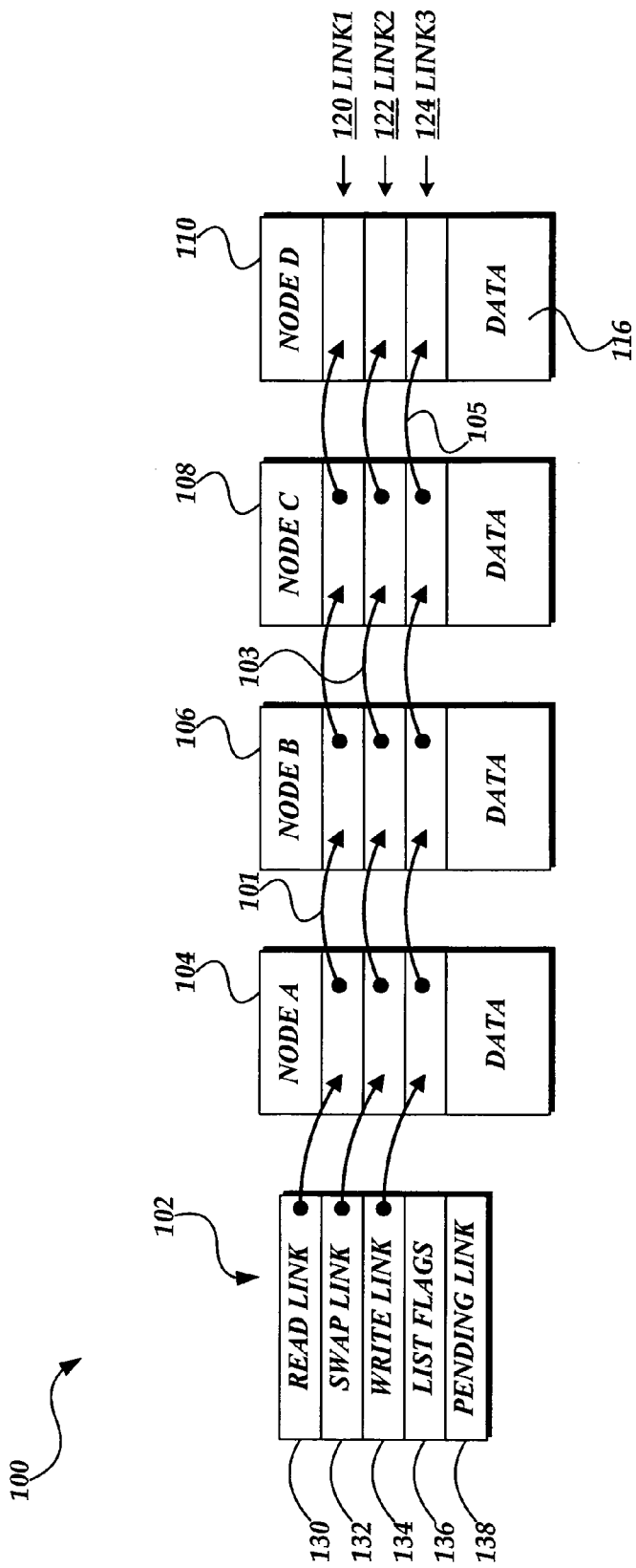
FIGS. 1A and 1B are pictorial diagrams illustrating exemplary components of a linked list suitable for substantially concurrent read and write operations.

With regard to concurrent read and write access to a linked list, FIG. 1A is a pictorial diagram illustrating exemplary components of a linked list 100 suitable for supporting substantially concurrent read access by a Reader process and write access by a Writer process. The linked list 100 includes a list head 102 comprising various fields, including, but not limited to, the following: a read link 130, a swap link 132, a write link 134, a pending link 138, and list values 136 for storing various flags and other values related to one or more aspects of the linked list. With regard to the list head 102, it should be appreciated that this is a logical construct and may not correspond to an actual structure per se. More particularly, in an actual implementation, those skilled in the art will recognize that the functionality of the list head 102 may be incorporated within one or more structures or records associated with the linked list (though not the linked list elements) and not implemented as an actual distinct structure.

As will be described in greater detail below, the read link 130, the swap link 132, the write link 134, and the pending list 138 are pointers to the items/elements in the linked list, hereafter referred to as nodes. Moreover, with regard to the nodes in the linked list 100, FIG. 1A illustrates that the exemplary linked list 100 includes four nodes, nodes 104-110. However, it should be understood that while a linked list 100 must include a list head 102, a linked list may be empty as to items or elements in the list, and therefore contain no nodes. Thus, while four nodes 104-110 are illustrated in FIG. 1A, it is for illustration purposes only as a linked list may contain zero or more nodes.

Figure 1B:
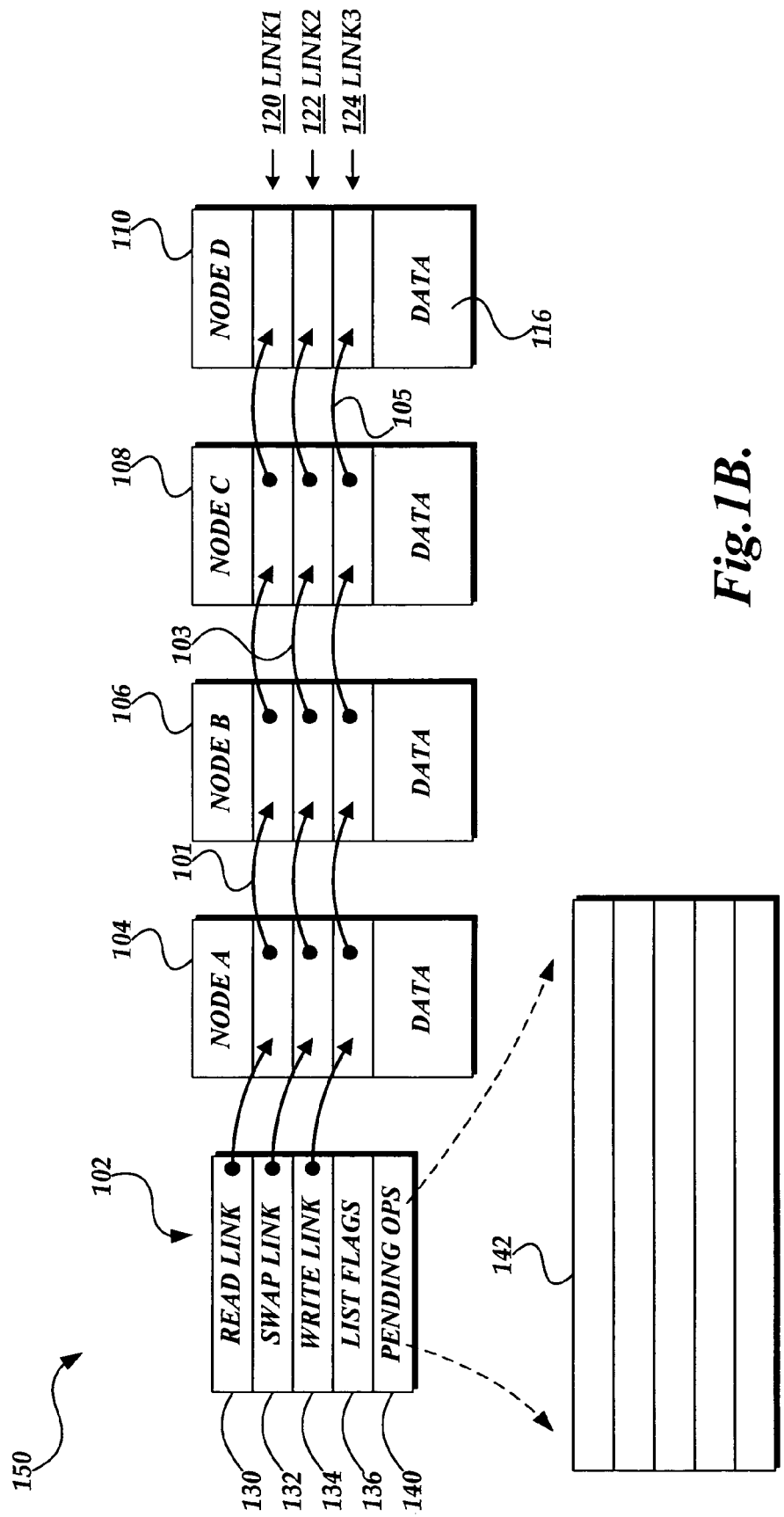

The pending link 138 points to nodes in the linked list 100 which have been modified (either added or deleted) by a Writer process but cannot yet complete the operation due to concurrent access by a Reader process. Information in each node (not shown) indicates the operation to be completed as well as links to additional items that have been modified. In a conceptual sense, the pending link 138 and the information in the modified nodes act as a queue of write operations to be completed on the list. Accordingly, the linked list 100 could be alternatively configured to include a pending queue. To that end, FIG. 1B is a pictorial diagram illustrating an alternative configuration of a linked list 100 suitable for supporting substantially concurrent read and write access that also includes a pending operations queue 140. In this embodiment, as write operations cannot be fully completed due to concurrent read access on the linked list 100, the "pending" operation is described in the pending operations queue 140 for completion by the Writer process.

With reference again to FIG. 1A, in order to support substantially concurrent read and write access to the linked list 100, each node in the list includes three pointers to a next node in the linked list, though they may not point to the same next nodes. For example, Node D 110 includes three links 120-124. As mentioned, each link in a node points to the next node in the linked list 100, or is null (or some other indicative value) indicating the end of the linked list. Moreover, while not shown, nodes in the linked list may also include one or more links to previous nodes. The inclusion of one or more "previous" links in each node is well within the knowledge of those skilled in the art, and the principles disclosed herein may be easily and suitably applied to previous links without any undue experimentation. However, for simplicity in description and illustration, only forward links are illustrated.

For convenience, the links of each node will be referred to as Link1, Link2, and Link3, which, to Node D 110, correspond to links 120-124, respectively. Each set/level of links (i.e., the Link1 links of the nodes in the linked list 100) are viewed as forming one list of nodes in the linked list 100. For example, all Link1 links in the linked list nodes form a first list of nodes (referred to as the Link1 list), all Link2 links in the linked list nodes form a second list of nodes (referred to as the Link2 list), and all Link3 links in the linked list nodes form a third list of nodes (referred to as the Link3 list).

While FIG. 1A shows the lists of nodes, per Link1, Link2, and Link3, as all forming the same list of nodes, this is reflective of a fully updated state of the linked list 100. As will be seen in regard to FIGS. 2A-2F, when concurrent read and write access is granted, the lists formed by the various sets of links do not always represent the same list of nodes.

The three list pointers in the list head 102, i.e., the read link 130, the swap link 132, and the write link 134, each point to one of the Link1, Link2, and Link3 lists. However, the read link 130, the swap link 132, and the write link 134 are not constrained to always point to a specific list (Link1, Link2, or Link3 list) and, as will be described below, are likely to be changed to reflect updated information in the linked list 100 in view of changes by a Writer process. In an embodiment, information in the list values 136 is determinative as to which specific list of nodes the read link 130, the swap link 132, and the write link 134 reference.

The read link 130 points to one of the lists of nodes, either the Link1, Link2, or Link3 list, and is referred to hereafter, generically, as the read list. The read list (as referenced by the read link 130) is used by a Reader process when reading or traversing the nodes, such as nodes 104-110, of the linked list 100. While a Reader process has read access to the linked list 100, a concurrent Writer process cannot update the read list (thus, changes for the read list must be queued up).

The swap link 132 points to one of the lists of nodes, either the Link1, Link2, or Link3 list, and is referred to, generically, as the swap list. When a Reader process has access to the linked list 100, the swap list is accessible to a Writer process (i.e., the Writer process can directly write to or modify the swap list) but swapping the swap list with the write list involves an atomic exchange condition. In particular, if the swap list is marked as updated and ready for swapping, the Writer process must take an additional step of swapping the write list and swap list, and then perform the update to the "new" write list. Modifications for the read list are queued onto the pending list.

Conceptually, swapping two lists is done by simply exchanging list values in the list head 102 to indicate the new arrangement of link assignments, such as exchanging/swapping the values of the read link 130 and the swap link 132. In other words, when swapped, the list of nodes previously pointed to by the swap link 132 becomes the read list, and the list of nodes previously pointed to by the read link 130 becomes the swap list. Swapping the lists is illustrated in more detail below by way of example in regard to FIGS. 2A-2F, and also described in the illustrated routines of FIGS. 4-8. Finally, as mentioned above, the write link 134 points to a list of nodes, either via the Link1, Link2, or Link3 list, and is referred to, generically, as the write list. The write list is always available for modifications to a Writer process with write access to the linked list 100.

Each node, such as Node D 110, will include a data area 116 that stores the subject matter/information for the node. Nodes 104-110 are illustrated as including a title, such as "NODE A," but it should be appreciated that the title is supplied for illustration purposes only, and may not typically be found in a node in a linked list 100. Thus, while a node may include a title field as part of its data area 116, in the present discussion they are not viewed as actual elements of the nodes. Additionally, while various fields and data areas have been described, nodes in the linked list 100 may include other fields, values, or data areas that are not described herein, including additional fields utilized for managing the operation of the linked list. Thus, the present description of a node in the linked list 100 should be viewed as illustrative only, and not limiting to any particular embodiment.

With regard to the present discussion, it should be noted that when using the terms reading, writing, updating, and/or deleting, they are made in regard to the linked list 100 and the arrangement of the nodes in the linked list, and not directed to the contents of the nodes (i.e., the data area 116).

The list values 136 include flags, values, state information, and the like, that enable the linked list 100 to support substantially concurrent access by a Reader process and a Writer process. An exemplary arrangement of the list values 136, as well as how its fields might be used, is made below in regard to FIG. 3.

To better illustrate aspects of how the linked list 100 supports concurrent read and write access, reference is now made to FIGS. 2A-2F. Beginning with FIG. 2A, this figure illustrates the exemplary linked list 100 from FIG. 1A, and further includes a Reader process 202 and a Writer process 204. For this example, the Reader process 202 is first to gain access to the linked list 100 and does so via an "open read access" procedure. As those skilled in the art will appreciate, an "open read access" procedure will likely be implemented as one or more routines, methods, procedures, or interface calls relating the linked list 100. Typically, as part of the "open read access" procedure, various flags and/or values in the list values 136 are set indicating that the Reader process 202 has read access to the linked list 100. Once the Reader process 202 opens read access to the list, or as a part thereof, the Reader process obtains a pointer to the read list from the read link 130 to Node A 104, as indicated by arrow 201, such that the Reader process can traverse the nodes on the read list. The dotted line from the Reader process 202 indicates that the Reader process has read access to the linked list 100. Similarly, the lack of a dotted line from the Writer process 204 to the linked list indicates that it does not have write access to the linked list.

As indicated before, the read link 130 (or any of the three links) may or may not correspond to a particular field dedicated as the read link in the list header 102. In one embodiment, the list header 102 includes an array of links to nodes with an index value indicating which of the links should be used as the read link 130, the swap link 132, and the write link 134. In this manner, swapping lists could be simply implemented by incrementing and/or decrementing an index value. Clearly, in incrementing and/or decrementing an index value, appropriate mechanisms must be used to guarantee safe "swapping", from a concurrency standpoint. In many instances, increments and decrements may be safely performed using a computer system's low level primitives that guarantee uninterruptible and indivisible operation. Thus, while the exemplary linked list 100 is illustrative of fixed fields for the read, swap, and write links, this is for illustration only, and should not be construed as limiting upon the present invention.

Continuing the example from above, after the Reader process 202 opens read access on the linked list 100, the Writer process 204 similarly opens write access on the linked list. Opening write access on the linked list 100 uses similar procedures to those described above in regard to opening read access, and will likely result in the list values 136 being modified to indicate that the Writer process has write access to the list.

Figure 2A:
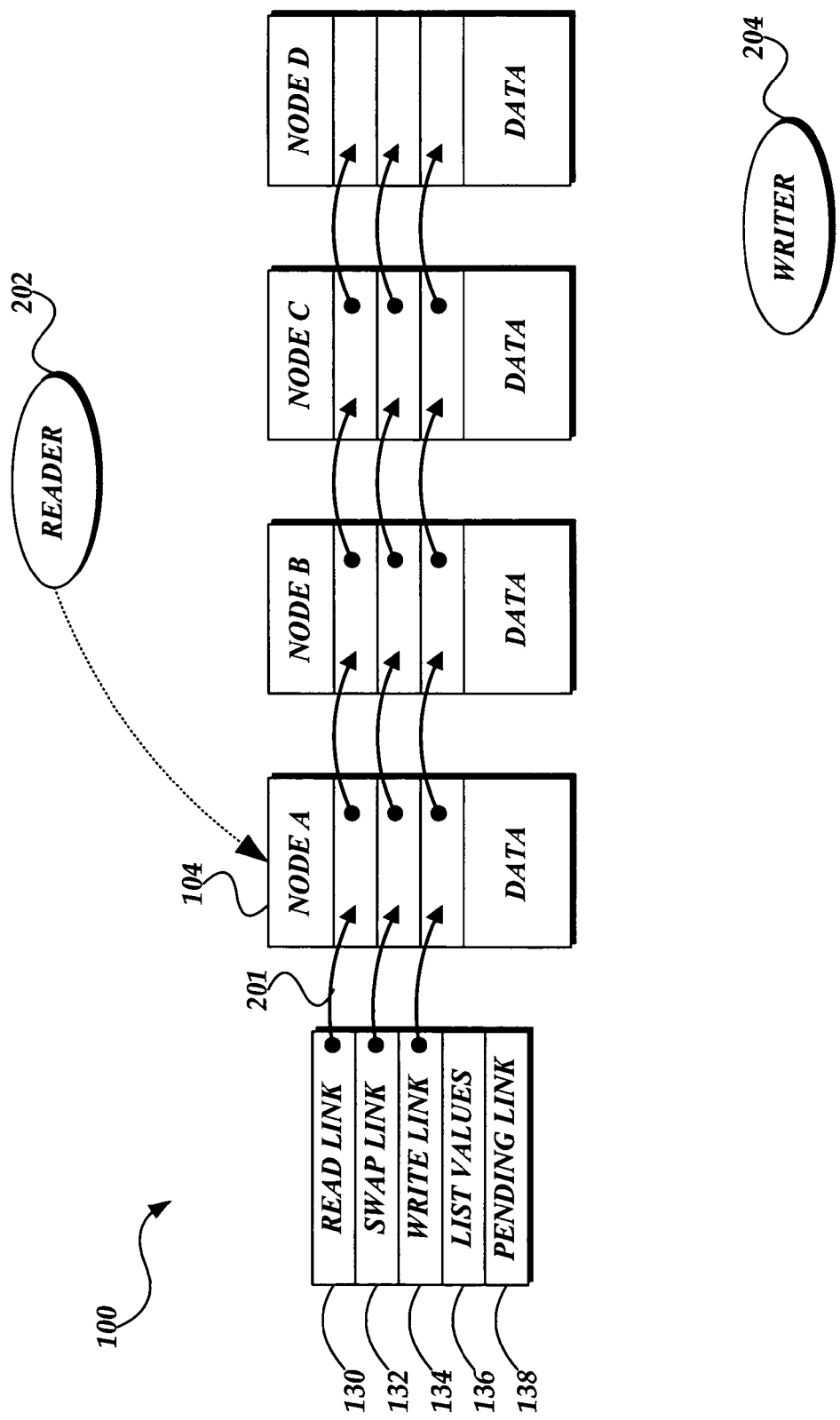
FIGS. 2A-2F are pictorial diagrams of an exemplary linked list suitable for substantially concurrent read and write operations for illustrating exemplary read and write operations having concurrent access to the list.
Figure 2B:
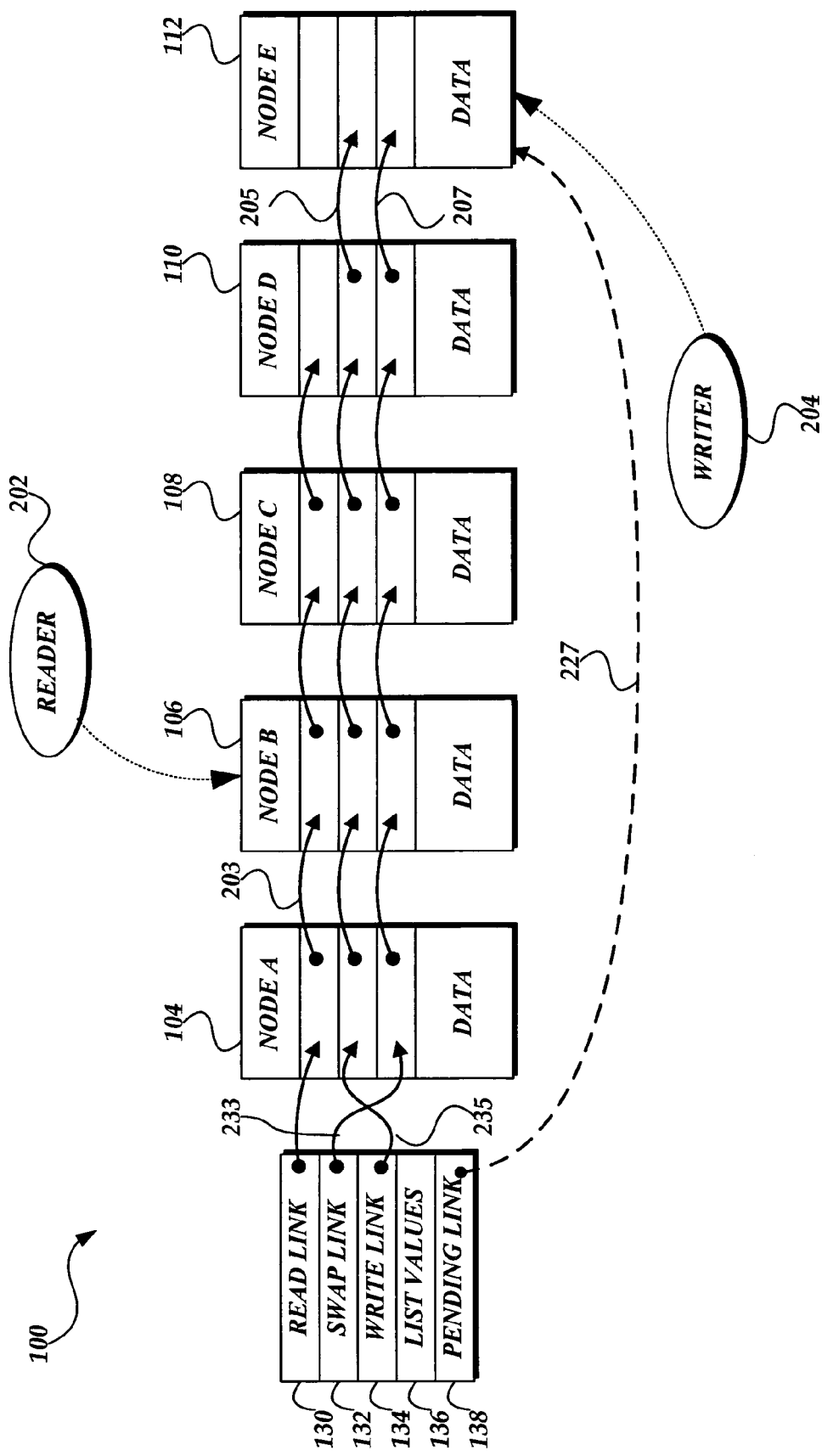

Turning now to FIG. 2B, and continuing the example from above, the Reader process 202 traverses from Node A 104 to Node B 106, following the read list as indicated by arrow 203. Substantially concurrently with the Reader process 202, the Writer process 204, which now has write access to the linked list 100, adds to the linked list by appending Node E 112. As part of adding Node E 112 to the linked list 100, the Writer process 204 updates the write list, as pointed to by the write link 134, by adding a pointer from Node D 110 to Node E 112 in Node D's link3 field, as indicated by arrow 207. As an additional aspect of adding Node E 112 to the linked list 100, the Writer process 204 swaps the swap list and the write list (as indicated by arrows 233 and 235) and updates the new write list with the same updates as applied to the old write list. In the present example, the new swap list is updated with the addition of Node E 112, as indicated by arrow 205. Swapping the swap list and write list is described below in regard to FIG. 6. In regard to the switched write and swap lists, arrows 233 and 235 will be displayed on FIG. 2B only in order to simplify the drawings at a later point in the discussion.

The read list (as pointed to by the read link 130) is not updated since the Reader process 202 has concurrent read access to the linked list 100 and relies upon the read list to remain unchanged. Thus, as a further aspect of adding Node E 112 to the linked list 100, the Writer process 204 tests the list values 136 to determine whether or not a Reader process 202 currently has read access to the linked list 100. If a Reader process 202 has read access to the linked list 100, the Writer process 204 cannot immediately update the read list. In this example, since the Reader process 202 has concurrent read access to the linked list 100, the Writer process 204 does not update the Node D 110 on the read list to point to Node E 112. Instead, the Writer process 204 writes information to the linked list 100 regarding updating Node D 110 to point to Node E 112. In particular, the Writer process 204 updates the pending link 138 to point to Node E, as indicated by dashed arrow 227.

As indicated in regard to FIG. 1B, rather than writing information to the nodes and updating the pending link 138, in an alternative embodiment described in FIG. 1B, the pending operations could be written to a pending queue 142 for later execution.

As another aspect of adding Node E 112 to the linked list 100, and assuming that the Writer process 204 is now finished updating the linked list 100, the Writer process 204 optionally indicates in the list values 136 that the swap list, as pointed to by the swap link 132, is now updated and ready for swapping. Of course, if the Writer process 204 has additional actions to take at this time, the Writer process need not mark the list as updated and ready for swapping until those additional actions are completed. As a further option, the Writer process 204 indicates that the swap list is updated and ready for swapping upon releasing write access if there is concurrent read access.

As previously suggested, when the linked list 100 is marked as having its swap list updated and ready for swapping, a Writer process 204 must take particular care to ensure that, during a swap with the swap list, a concurrent Reader process 202 does not access the swap list while it is in an unstable condition. Accordingly, the Writer process 204 must swap the write list and swap list in an uninterruptible exchange.

When the list values 136 indicate that the swap list (as pointed to by the swap link 312) is updated and ready for swapping, this signals the Reader process 202 that an updated version of the linked list 100 is available in the swap list. By swapping the read list with the swap list, i.e., swapping the values of the read link 130 and the swap link 132, the Reader process 202 can gain access to an updated version of the linked list 100. Swapping the read list and the swap list is described below.

Figure 2C:
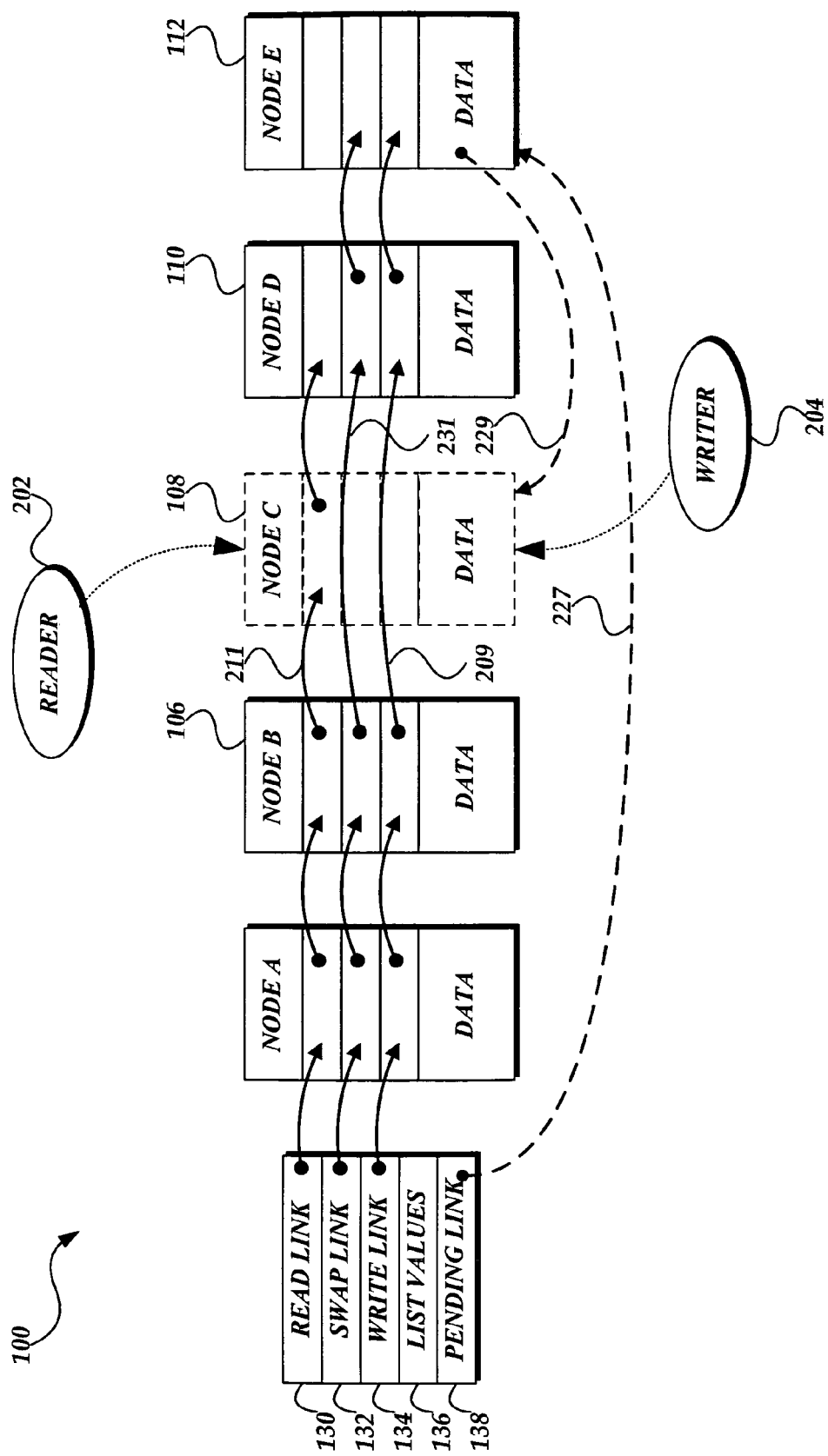

Turning now to FIG. 2C and continuing the example from above, after a period of time, the Writer process 204 proceeds to delete/remove Node C 108 from the linked list 100. Accordingly, the Writer process 204 updates the write list by modifying the write list of Node B 106 to point to Node D 110, as indicated by arrow 209. Moreover, as described above, the Writer process swaps the write list and swap list (not shown in FIG. 2C), and applies the modifications (i.e., deleting Node C 108) from the "new" write list, as indicated by arrow 231. Additionally, the Writer process 204 updates the pending link to continue from Node E 112 to point to Node C 108, as indicated by arrow 229, as part of the pending operations for the read list. Of course, this is just one example of queuing a delete operation to the linked list 100, and should not be viewed as a limiting aspect of the present invention.

As above, since the Reader process 202 has concurrent read access to the linked list 100, the read list cannot presently be modified/updated to reflect that Node C 108 is to be removed. However, while Node C 108 has been removed from the swap and write lists (as pointed to by the write link 134 and the swap link 132), the read list still points to Node C 108. Thus, finally deleting Node C 108 from the linked list 100 may not be completed until the pending operations on the list are finalized by a Writer process 204.

Continuing the example from above, since the deletion of Node C 108 is pending with regard to the read list, the Reader process 202 can continue with its read operation by traversing from Node B 106 to Node C 108, as indicated by arrow 211. For this example, the Writer process 204 now releases its write access to the linked list 100, typically via a call to a routine or method for releasing write access to the linked list. As part of releasing write access to the linked list 100, the Writer process 204 will attempt to finalize the pending operations. However, a Writer process 204 can only finalize the pending operations if there is no Reader process 202 with read access. In this case, because the Reader process 202 has concurrent read access to the linked list 100, the Writer process 204 cannot finalizing any pending operations. Instead, if not already indicated, the Writer process 204 marks the swap list as updated and ready for swapping.

Figure 2D:
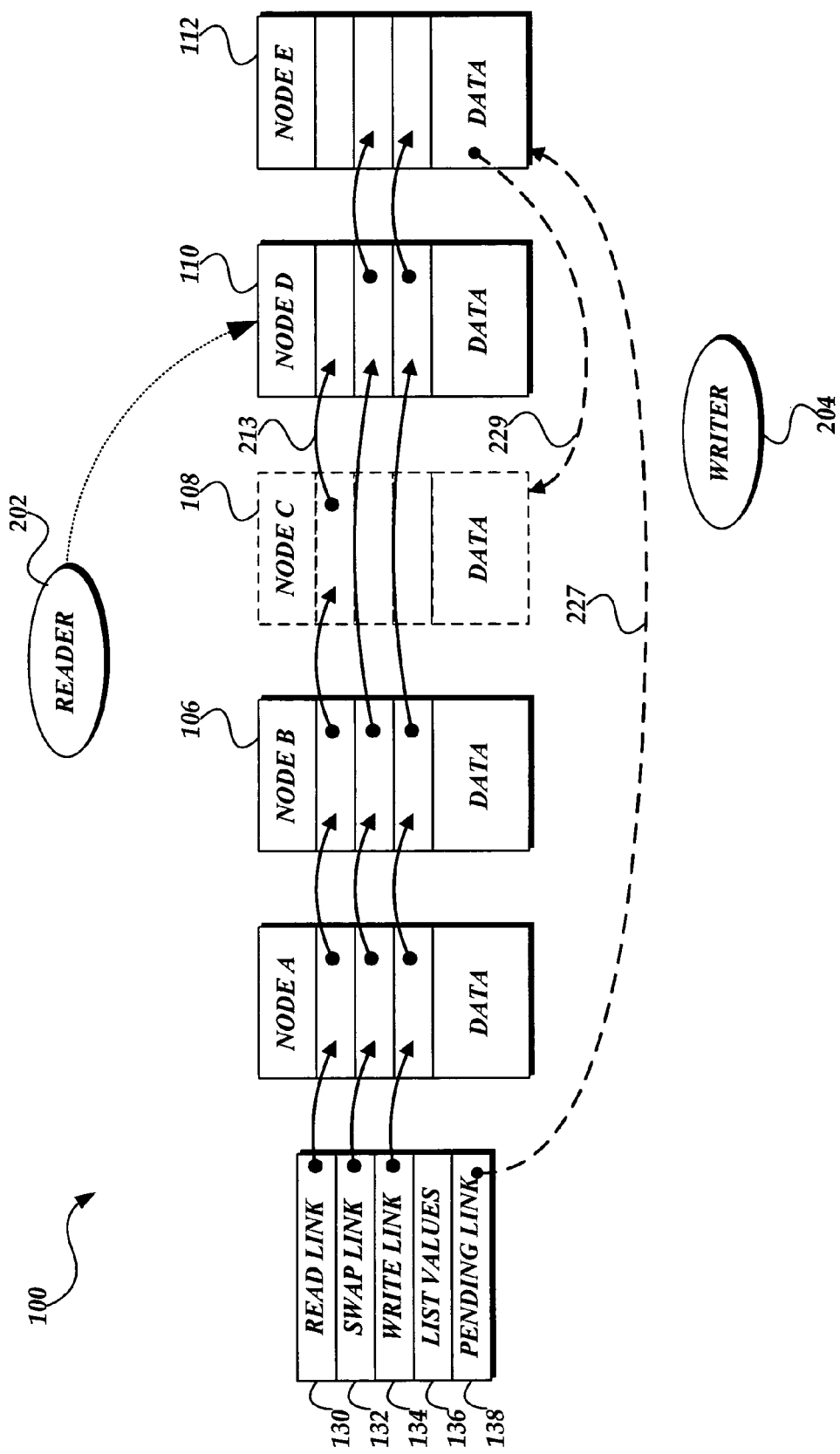

With reference to FIG. 2D and continuing the above example, the Reader process 202 traverses from Node C 108 to Node D 110 by following the read list, as indicated by arrow 213. Moreover, as a further step in iterating through the linked list 100, at Node D 110, the Reader process 202 determines that Node D 110 is the last node since there is no additional link on the read list to Node E 112 (though it is pending.) At this point, however, the Reader process 202 tests the list values 136 and determines that an updated list, as contained in the swap list, is available. Accordingly, the Reader process 202 executes a swap operation to exchange the read list with the swap list. As indicated above, in at least one implementation, swapping two lists involves nothing more than updating index numbers in the list values 136.

Figure 2E:
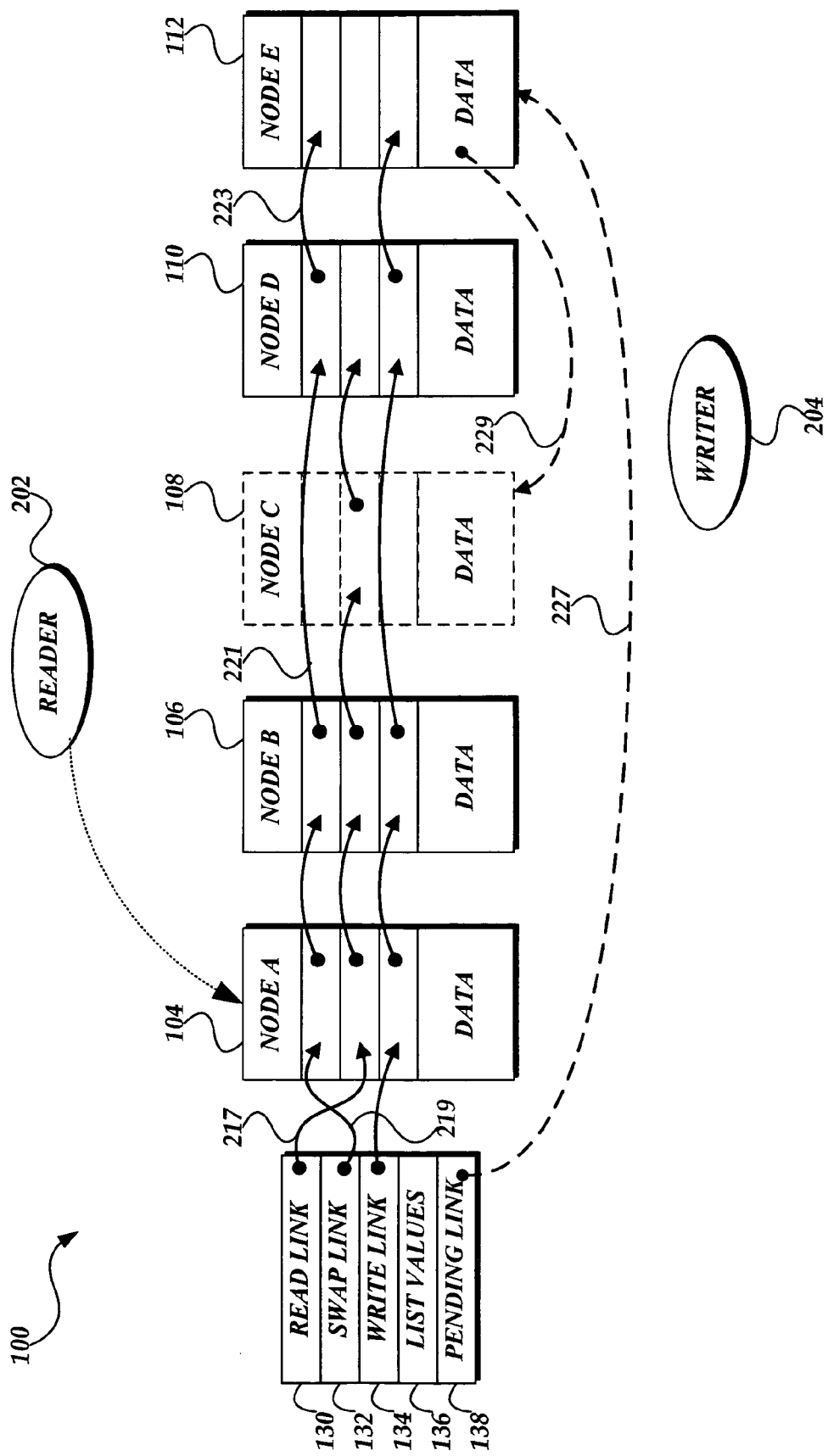

With reference now to FIG. 2E, the exchange of the read list and the swap list is indicated by arrows 217 and 219. Alternatively, exchanging the lists may simply involve changing an index value indicating which list corresponds to the read, swap, and write lists. Additionally, as part of the swap operation, the updated and ready for swap indication in the list values 136 is cleared. Since the current swap list is now available, pending operations pertaining to the new swap list may be performed by a Writer process 204.

Figure 2F:
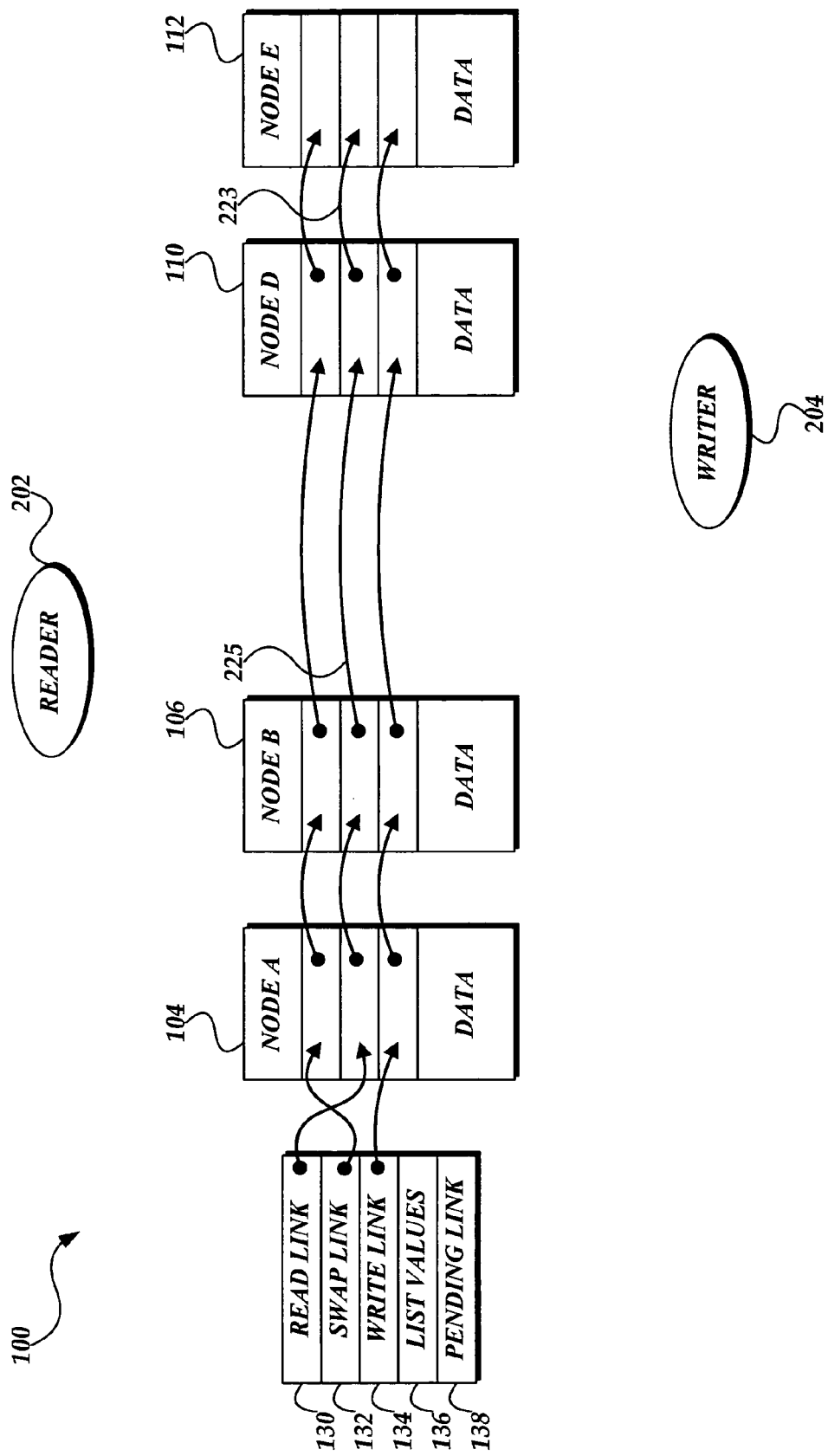

Turning now to FIG. 2F and continuing the example from above, once the Reader process 202 has completed its operation of reading the linked list 100, the Reader process releases its access to the linked list. Typically, releasing read access is performed by executing a release routine that, among other things, clears a read access value in the list values 136. Once the read access is released, all of the pending operations on the linked list 100 can be carried out. More particularly, the next time that a Writer process 204 needs to update the linked list 100, it will detect that there are pending operations and will finalize the pending operations, which entails, for the present example, linking Node B 106 to Node D 110, as indicated by arrow 225, and linking Node D 110 to Node E 112, as indicated by arrow 223. Moreover, the information on the pending link 138 is cleared.

Figure 3:
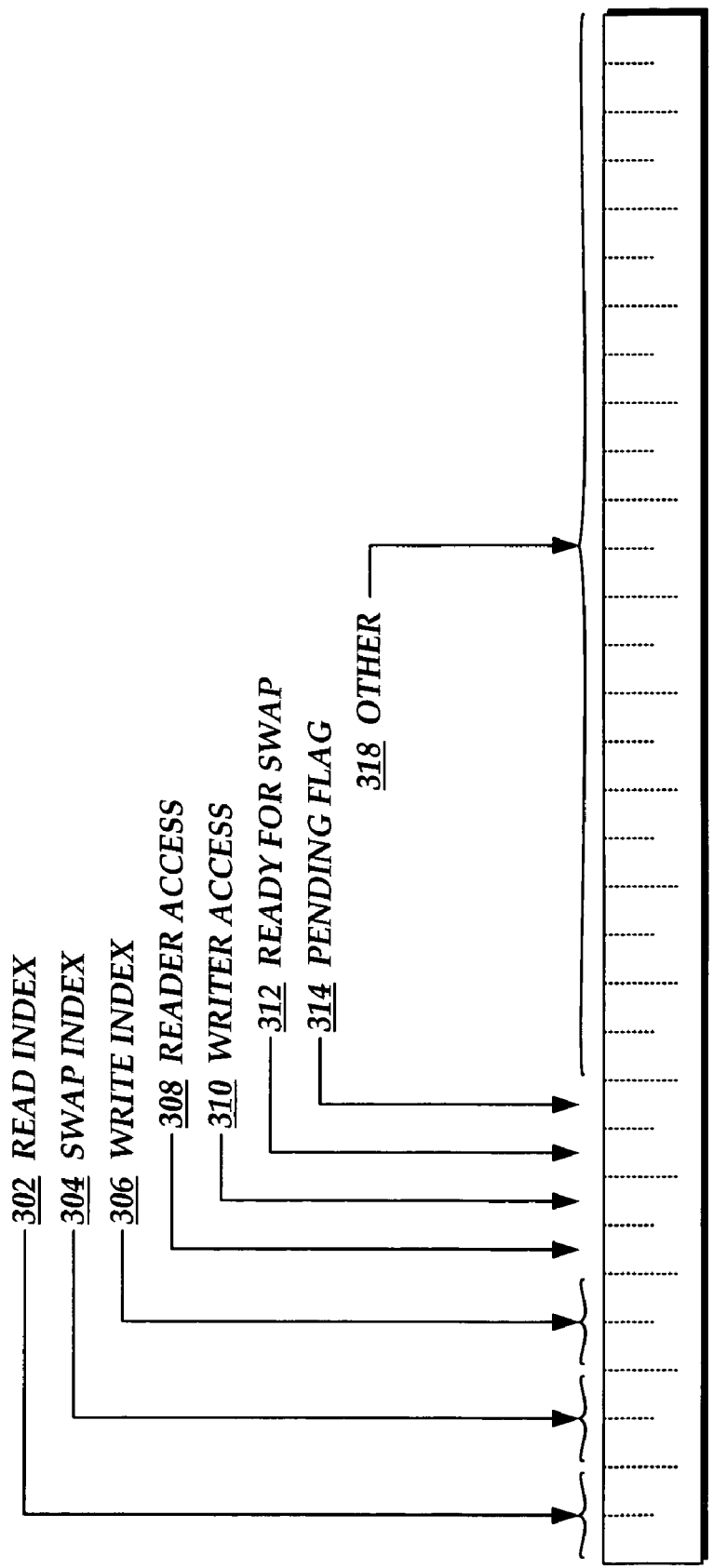
FIG. 3 is a block diagram illustrating an exemplary arrangement of the list flags.

Turning now to FIG. 3, FIG. 3 is a block diagram illustrating an exemplary organization of list values 136 in the list head 102, which have been referenced above in regard to FIGS. 1 and 2. In the illustrated embodiment, access to the various values and flags in the list values 136 are controlled through well-known bit manipulation and masking operations. It should be appreciated, however, that while the illustrated list values 136 is shown as a single 32-bit field, those skilled in the art will appreciate that the entirety of the list values may be implemented in any number of ways including, but not limited to, a data structure having fields for each value required to be found in the list flags and the like. Accordingly, the illustrated list values 136 shown in FIG. 3 is just one possible manner in which the list values 136 may be implemented, and should not be construed as limiting upon the present invention.

As shown in FIG. 3, a read index 302 includes two bits of the 32-bit list flags. With these two bits, the read index 302 identifies which of the various lists, Link1, Link2, or Link3, is to be used as the read list. Similarly, a swap index 304 and a write index 306 identify two bits which identify which of the lists correspond to the swap list and the write list, respectively. Of course, in one embodiment, since there are only three list indices (i.e., read, swap, write), knowing the index numbers for the read list and the swap list is enough to know which is the write list. Accordingly, in one configuration, a write index 306 is omitted. Clearly, there are many configurations that may be used to implement the mapping of links to the read, swap, and write lists.

In the illustrated embodiment, the reader access bit 308 indicates whether a Reader process 202 currently has read access to the linked list 100. Similarly, an optional writer access flag 310 indicates whether or not a Writer process 204 has write access to the linked list. The updated bit 312, as indicated above, indicates whether or not the swap list (as identified by the swap link 132) is updated and ready for swapping by a Reader process 202.

The list value 136 may also optionally include a queued operations flag 314 indicating whether or not there are any pending operations queued on the pending link 138. Still other bits, as identified by 318, may also be used to implement various aspects of the linked list 100 not specifically described herein.

Turning now to FIGS. 4-8, these figures illustrate exemplary routines useful for a linked list 100 in implementing concurrent read and write access to elements in the linked list. It should be appreciated, however, that these figures illustrate only those routines key to supporting concurrent read and write access, and not all routines, methods, or procedures involved with generally implementing a linked list are shown. Knowledge for generally implementing a linked list is well known and not presented herein.

Figure 4:
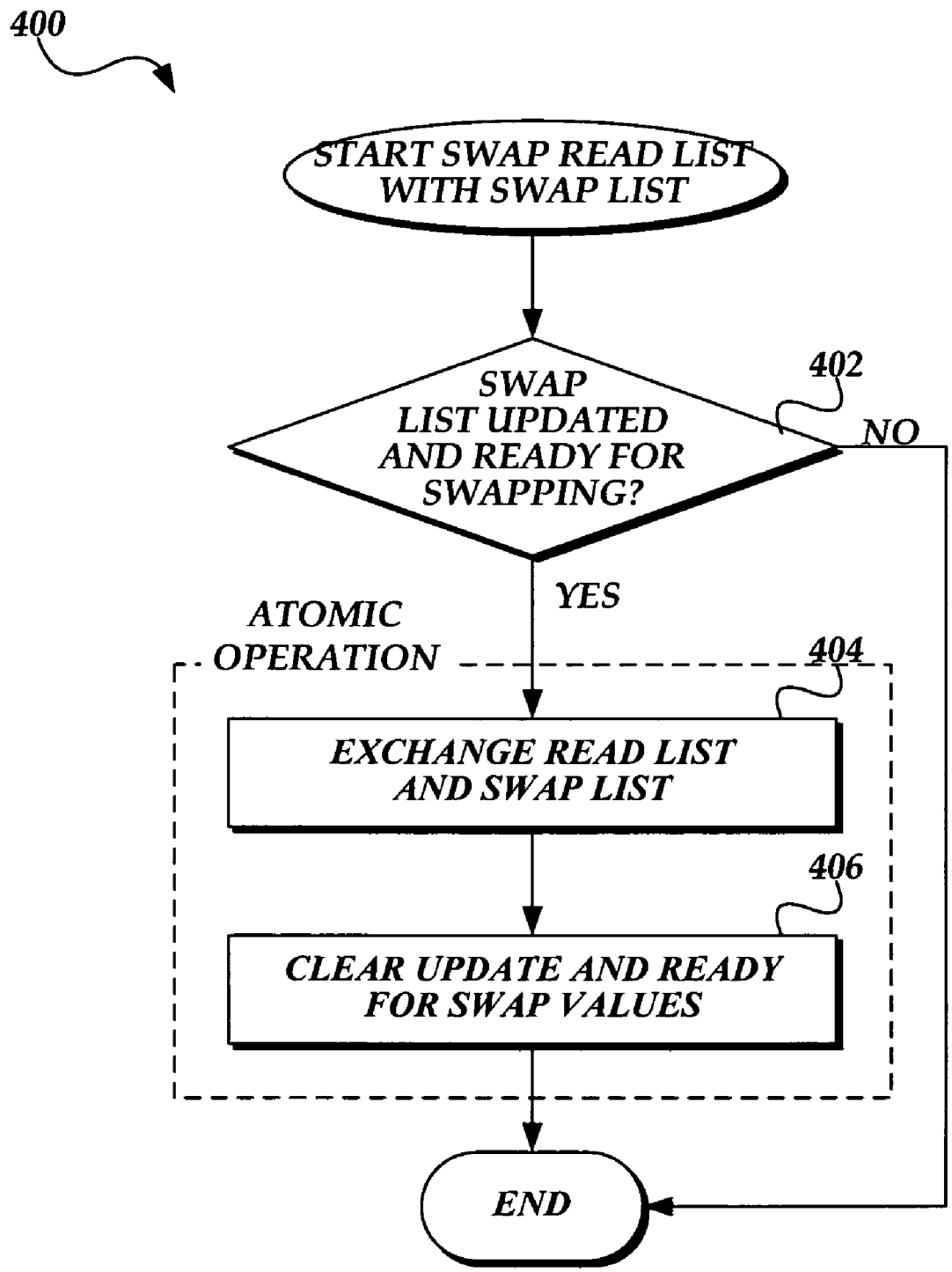
FIG. 4 is a flow diagram illustrating an exemplary routine for swapping a read list with a swap list to support aspects of concurrent read and write access to a linked list.

With regard to FIG. 4, this figure illustrates an exemplary routine 400 suitable for implementing a swap between the read and swap lists in a linked list 100. A decision to swap the read list and the swap list is typically made and instigated outside of the operation of the linked list 100, or upon gaining read access to the link list. Beginning at decision block 402, a determination is made as to whether the swap list is updated and ready for swapping. In one implementation, this determination is made by atomically testing one or more values in the list values 136. If the list values 136 do not indicate that the swap list is updated and ready for swapping, the exemplary routine 400 terminates, since no updates are available.

Alternatively, if the list values 136 indicate that the swap list is currently updated and ready for swapping, at block 404 the values of the read link 130 and the swap link 132 are exchanged. As indicated earlier, swapping may be accomplished by exchanging the values of the read link 103 and swap link 132, or by updating the corresponding index values in the list values 136. At block 406, after having swapped the read and swap lists, the updated and ready for swapping indication in the list values 136 is cleared. It should be appreciated that the exchange of the swap list and read list, as well as clearing the updated and ready for swapping indicator, should be performed as a single atomic operation, i.e., indivisible and uninterruptible, as indicated by the dashed box. Performing the swap and clearing the updated and ready for swapping indicator as an atomic operation prevents the unreliable results of a race condition from concurrent access of a Reader process 202. Thereafter, the exemplary routine 400 terminates.

Figure 5:
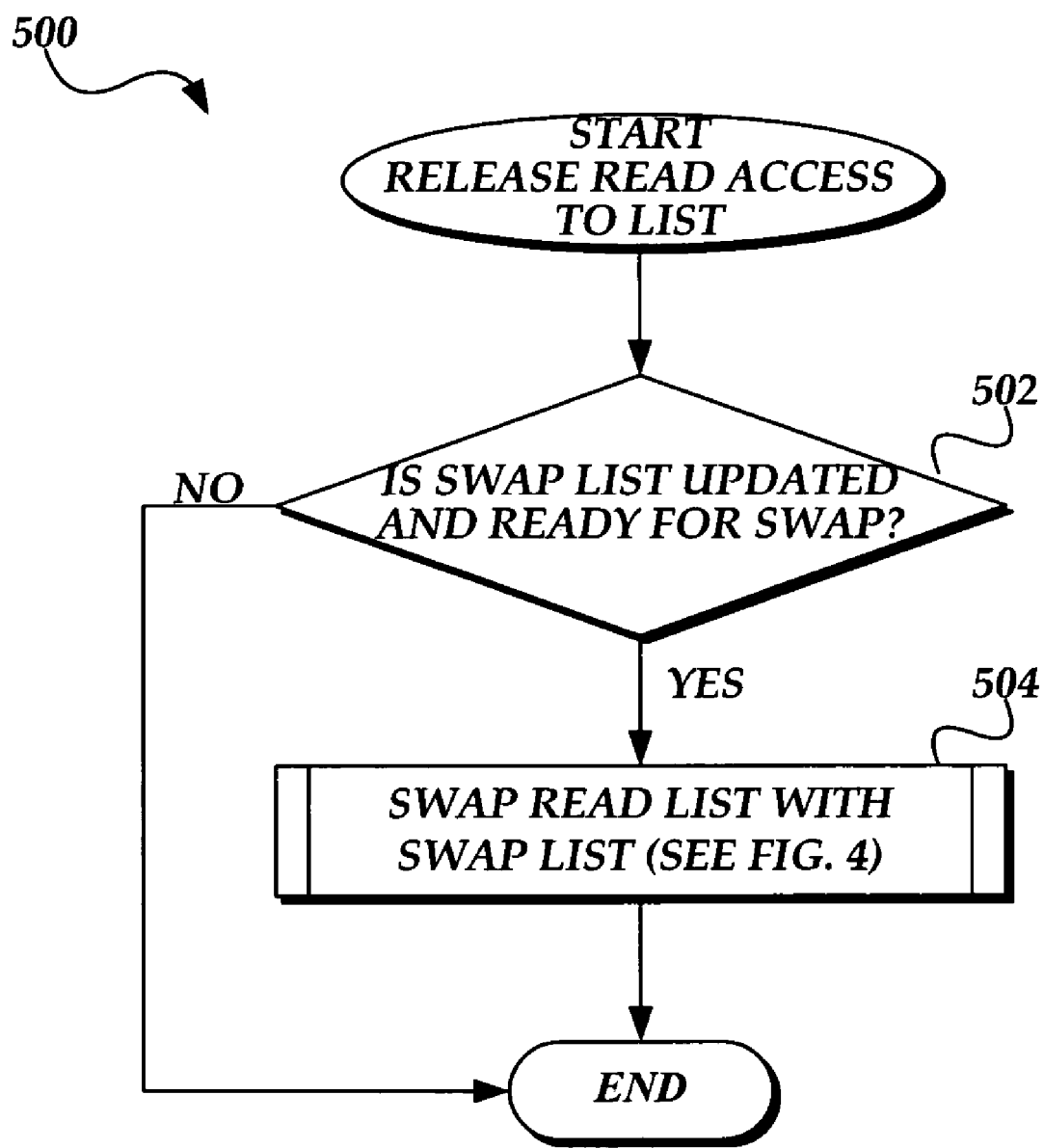
FIG. 5 is a flow diagram illustrating an exemplary routine for releasing read access on a linked list supporting concurrent read and write access.

With regard to FIG. 5, this figure illustrates an exemplary routine 500 for releasing read access on a linked list 100 supporting concurrent read and write access. Beginning at decision block 502, a determination is made as to whether the swap list is currently updated and ready for swapping. If not, the exemplary routine 500 terminates. Alternatively, if the swap list is updated and ready for swapping, as indicated by one or more values in the list values 136, at block 504, the read list and swap list are swapped, as described above, in regard to the exemplary routine 400. Moreover, as indicated in regard to FIG. 4, swapping the read list and swap list and clearing the updated and ready for swapping indicator are performed as a single atomic operation.

Swapping the read list with the swap list when releasing read access places the linked list 100 in a condition to be later fully updated by a Writer process 204. However, since only the Writer process 204 carries out the pending operations on the linked list 100, after swapping the read list and swap list, the exemplary routine 500 terminates.

Figure 6:
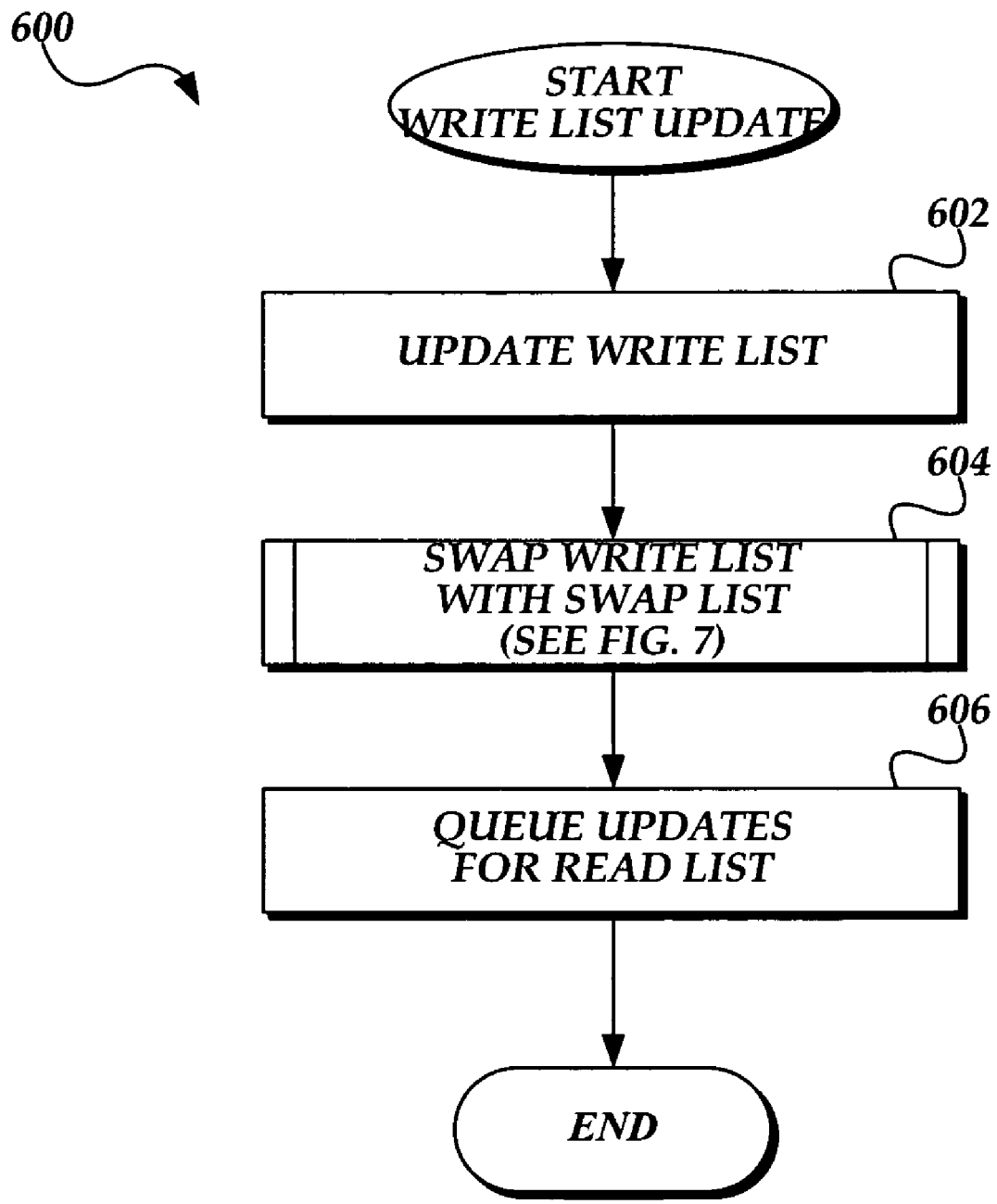
FIG. 6 is a flow diagram illustrating an exemplary routine for updating a write list within a linked list supporting concurrent read and write access.

FIG. 6 is a flow diagram illustrating an exemplary routine 600 for performing updates on a write list portion of a linked list 100 supporting concurrent read and write access. Beginning at block 602, the updates to the write list are performed. At block 604 the write list and swap list are exchanged/swapped, as described in the exemplary routine 700 below in regard to FIG. 7. After swapping, which updates the new write list, at block 606 the current update operations are queued up for the read list. Thereafter, the routine 600 terminates.

Figure 7:
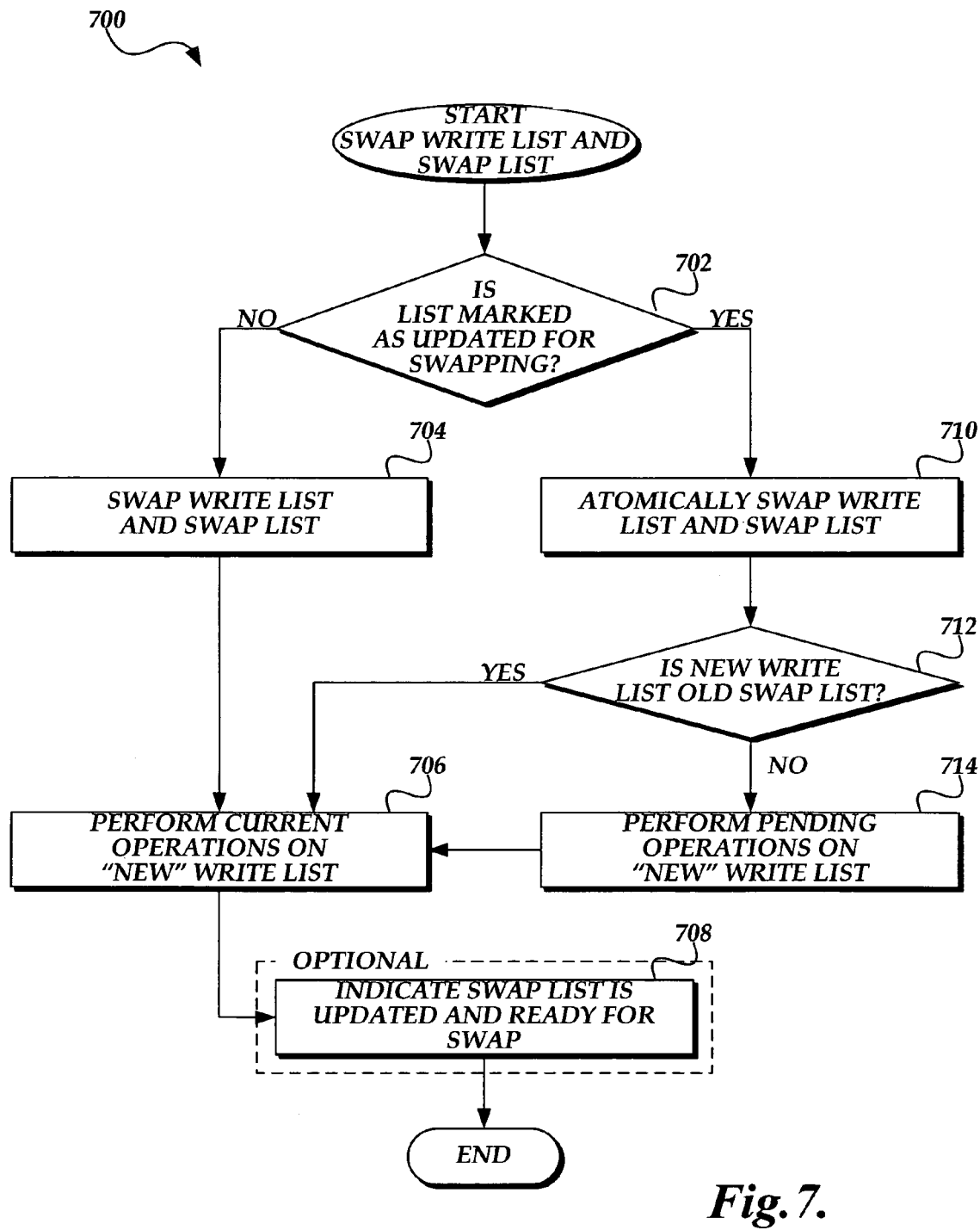
FIG. 7 is a flow diagram illustrating an exemplary routine for swapping an updated write list with a swap list to support aspects of concurrent read and write access to a linked list.

As indicated above, FIG. 7 is a flow diagram illustrating an exemplary routine 700 for swapping the write list and swap list which is performed during updates by a Writer process 204. Beginning at decision block 702, a determination is made as to whether the swap list is updated and ready for swapping. If the swap list is not updated and ready for swapping, per the corresponding indicators in the list flags 136, the exemplary routine 700 proceeds to block 704 where the write list and the swap list are swapped. Moreover, since the swap list is not marked as updated and ready for swapping, there is no concurrency concern with regard to the Reader process 202. At block 706, the current write operations are performed on the "new" write list. At block 708, a value is optionally set in the list values 136 indicating that the swap list is now updated and ready for swapping. Thereafter, the routine 700 terminates.

If, at decision block 702, the linked list 100 is updated and ready for swapping, a race condition may occur between the Writer process 204 and the Reader process 202 in swapping the write and swap lists if care is not taken. Moreover, after a swap, the new write list could be the old read list, which will happen if the Reader process 202 switches the read list with swap list before the Writer process makes its swap, or the new write list could be the old swap list, which will happen if the Writer process 204 switches the swap list with the write list before the Reader process 202 makes its swap. Depending who wins this race condition, the outcome will be different. Accordingly, at block 710, the write list and the swap list are swapped in an atomic action, meaning that it cannot be interrupted.

At decision block 712, a determination is made as to whether the new write list (after the swap) is the old swap list. If the new write list is the old swap list, the routine 700 proceeds to block 706 where the new write list is updated with the current update operations. Alternatively, if the new write list is the old read list, the routine 700 proceeds to block 714. At block 714, any pending operations for the old read list are applied to the new write list. Thereafter, the routine proceeds to block 706 as described above, i.e., the current update operations are performed on the new write list. Thereafter, the routine 700 terminates.

Figure 8:
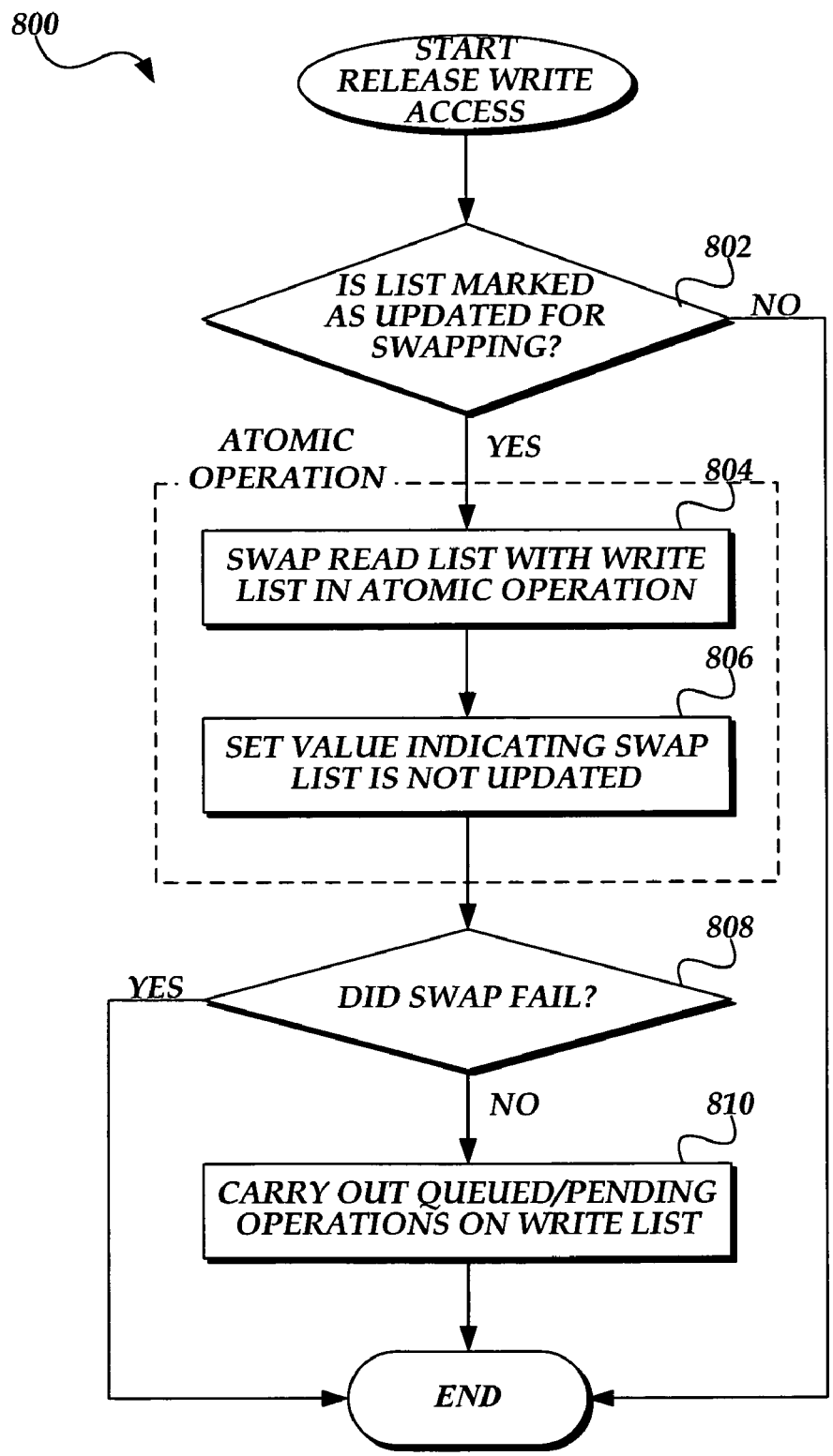
FIG. 8 is a flow diagram illustrating an exemplary routine for releasing write access on a linked list supporting concurrent read and write access.

With regard to FIG. 8, this figure illustrates a flow diagram of an exemplary routine for releasing write access on a linked list 100. Beginning at decision block 802, a determination is made as to whether the updated and ready for swapping indicator is set. If it is not, the exemplary routine 800 terminates as the list referenced by the read list is up to date. Alternatively, if the updated and ready for swapping indicator is set, the routine 800 proceeds to block 804.

At block 804, an attempt to swap the read list and the write list is made. Moreover, as illustrated, at block 806 the updated and ready for swapping indicator is cleared. However, as indicated by the dashed line around these two steps, the attempt to swap and clear the updated and ready for swapping flag are performed as atomic compare and exchange operations. Unlike the swap between the write list and swap list, when there is concurrent read access to the linked list 100 by a Reader process, this operation (i.e., swapping the read list and the write list) will fail. Accordingly, at decision block 804, a determination is made as to whether the swap failed. Additionally, if the swap fails, so too does the clearing of the updated and ready for swapping indicator.

If the swap failed, the exemplary routine 800 terminates, leaving the update of the read list for another time. Alternatively, if the swap was successful, at block 808 the currently pending operations are carried out on the new write list. Thereafter, the exemplary routine 800 terminates.

Figure 9:
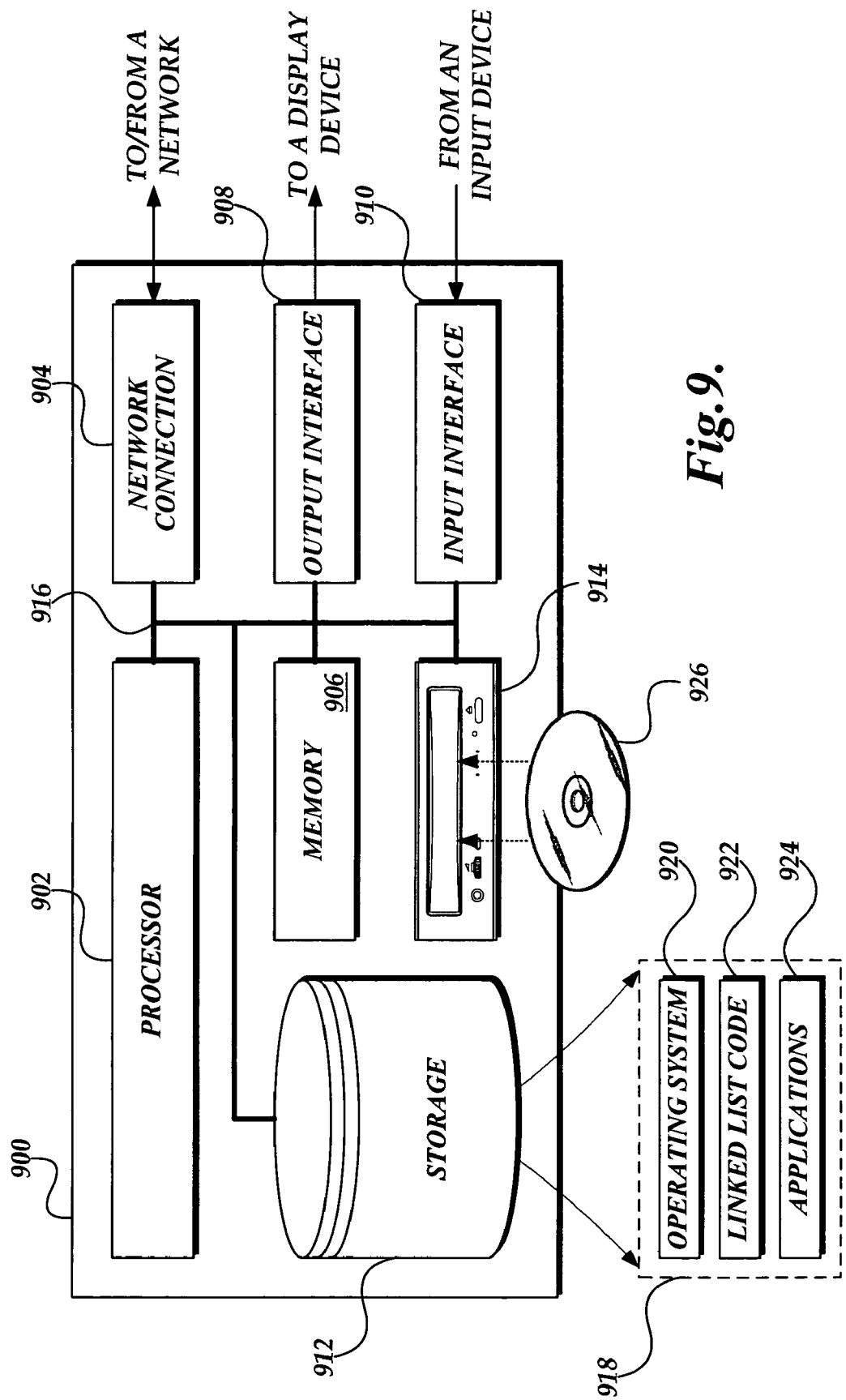
FIG. 9 is a pictorial diagram illustrating an exemplary computing device suitable for providing a linked list supporting concurrent read and write access.

While an exemplary linked list 100 supporting concurrent read and write access may be implemented on a variety of computing devices, FIG. 9 is a block diagram illustrating an exemplary computing device 900 for implementing a linked list with concurrent read and write access. In particular, the exemplary computing device 900 includes a processor 902, a memory 906, and a storage area 912, each interconnected via a system bus 916. When executing, the memory 906 of the exemplary device 900 typically stores all or portions of an operating system 920 as well as linked list code 922 for implementing a linked list having concurrent read and write access. The memory also typically includes one or more executing user applications, such as application 924, which may utilize the linked list code 922. It should be appreciated, however, that while the linked list code 922 is illustrated as being separate from the operating system 920, this is a logical distinction only and should not be construed as limiting upon the present invention. In an actual implementation, the linked list code 922 is an integral part of the operating system 920.

The storage area 912, which is typically a non-volatile storage means, typically stores the operating system 920 for retrieval into memory 906 and execution by the processor 902. The storage area 912 is typically comprised of one or more non-volatile storage components (in various combinations) including, but not limited to, a hard disk drive, ROM, non-volatile RAM, flash memory devices, and the like.

While illustrated as software applications stored in the storage area 912, it will be appreciated by those skilled in the art that any or all of the operating system 920 or the linked list code 922 may be implemented in hardware and/or software. Accordingly, numerous embodiments well understood in the art are viewed as falling within the scope of the present invention.

The exemplary device 900 also optionally includes a removable media device 914 for reading and/or writing information to and from removable media 926. Examples of a removable media device 914 include, but are not limited to, a CD- or DVD-ROM reader, a USB thumbdrive, flash memory device, removable hard drives, and the like. Moreover, it should be appreciated that one or more executable modules for implementing the various exemplary routines described above associated with a linked list 100 supporting substantially concurrent read and write access may be delivered upon these and other types of computer-readable removable media.

The exemplary device 900 optionally includes a network connection 904 that provides network access to and from external sources on a network. The exemplary device 900 also optionally includes an output interface 908 that connects the device 900 to a display device (not shown) for displaying information to a user. Similarly, the exemplary device 900 also optionally includes an input interface 910 that connects to one or more input devices (not shown) through which the user is able to interact with the computing device. Examples of input devices include, but are not limited to, keyboard, keypad, digitizing pen, mouse, microphone, and the like. Of course, in many instances the output interface 908 and the input interface 910 are combined into a single I/O interface. Accordingly, these, as well as numerous components described herein, should be viewed as logical, not necessarily actual, components.

While the various embodiments, including the preferred embodiment, of the invention have been illustrated and described, it will be appreciated that various changes can be made therein without departing from the spirit and scope of the invention.

The embodiments of the invention in which an exclusive property or privilege is claimed are defined as follows:

1. A method for providing concurrent read and write access to a linked list of elements for execution on a computing device comprising a processor and a memory, the method comprising:

storing in the memory of the computing device a linked list, the linked list including three internal lists and at least an updated indicator, wherein each element in the linked list includes at least a first link of a plurality of first links, a second link of a plurality of second links, and a third link of a plurality of third links, and a first internal list of the three internal lists comprises elements of the elements of the linked list referenced by the plurality of first links, a second internal list of the three internal lists comprises elements of the elements of the linked list referenced by the plurality of second links, and a third internal list of the three internal lists comprises elements of the elements of the linked list referenced by the plurality of third links;

providing read access to the linked list to a reader process such that the reader process reads elements in the linked list via a read list of the three internal lists, wherein the read list comprises the first internal list;

providing write access to the linked list to a writer process such that the writer process updates the linked list via a write list of the three internal lists, wherein the write list comprises the third internal list;

when the writer process updates the linked list by swapping an updated version of the linked list with the second internal list, setting at least the updated indicator, wherein the updated version of the linked list includes updates to the elements of the linked list provided by the writer process;

deferring updating of the read list to include the updated version of the linked list until the read process is completed, wherein the second internal list is swapped with the read list when the reader process is completed and at least the updated indicator is set, wherein the read access by the reader process and the write access by the writer process occur substantially concurrently; and receiving an update instruction from the writer process to further update the linked list according to the update instruction, wherein the writer process updates the linked list by swapping a second updated version of the linked list with the second internal list comprising the updated version of the linked list, and wherein receiving the update instruction from the writer process to update the linked list comprises:

determining whether the updated indicator is set, wherein the set updated indicator indicates that the second internal list is updated and ready for swapping with the read list; and when it is determined that the updated indicator is set and the read process is completed, atomically swapping the read list and the second internal list.

2. The method of claim 1, wherein:

when the writer process updates the linked list by swapping the updated version of the linked list with the second internal list, the updates to the elements of the linked list are stored as pending operations and, after the swapping, the write list comprises a new write list, the method further comprising:

determining whether the new write list comprises the read list prior to swapping with the second internal list; and when it is determined that the new write list comprises the read list prior to the swapping with the second internal list, applying the pending operations to the new write list.

3. The method of claim 1, wherein the updated indicator is stored among a plurality of values stored in a head element of the elements of the linked list.

4. The method of claim 1, wherein when the write access of the writer process to the linked list is released and the read process is not completed, setting the updated indicator, and wherein the pending operations are finalized after the read process is completed.

5. A computing device storing a linked list providing substantially concurrent read and write access to the linked list, the computing device comprising:

a processor;

a memory;

an operating system; and an executable module executing on the computing device and configuring the computing device to:

store in the memory a linked list including three internal lists, wherein each element in the linked list includes at least a first link of a plurality of first links, a second link of a plurality of second links, and a third link of a plurality of third links, and a first internal list of the three internal lists comprises elements of the elements of the linked list referenced by the plurality of first links, a second internal list of the three internal lists comprises elements of the elements of the linked list referenced by the plurality of second links, and a third internal list of the three internal lists comprises elements of the elements of the linked list referenced by the plurality of third links;

provide an updated indicator for indicating whether the second internal list of the three internal lists is updated and ready for swapping with a read list of the three internal lists, wherein the read list comprises the first internal list;

provide read access to the linked list to a reader process such that the reader process accesses elements in the linked list according to the read list;

provide write access to the linked list to a writer process such that the writer process updates elements in the linked list via a write list of the three internal lists, wherein the write list comprises the third internal list;

when the writer process updates the linked list by swapping an updated version of the linked list with the second internal list, set at least the updated indicator, wherein the updated version of the linked list includes updates to the elements of the linked list provided by the writer process;

defer updating of the read list to include the updated version of the linked list until the read process is completed, wherein the second internal list is swapped with the read list when the reader process is completed and at least the updated indicator is set; and receive an update instruction from the writer process to further update the linked list according to the update instruction, wherein the writer process updates the linked list by swapping a second updated version of the linked list with the second internal list comprising the updated version of the linked list;

wherein the computing device is further configured to receive the update instruction from the writer process to update the linked list, and in response:

determine whether the updated indicator is set, wherein the set updated indicator indicates that the second internal list is updated and ready for swapping with the read list; and when it is determined that the updated indicator is set and the read process is completed, atomically swap the read list and the second internal list; and after the second internal list is swapped with the read list, modifying the updated indicator to indicate that the second internal list is not updated and is not available for swapping with the read list.

6. The computing device of claim 5, wherein: when the writer process updates the linked list by swapping the updated version of the linked list with the second internal list, the updates to the elements of the linked list are stored as pending operations and, after the swapping, the write list comprises a new write list, and wherein the computing device is configured to determine whether the new write list the read list prior to swapping with the second internal list; and when it is determined that the new write list comprises the read list prior to the swapping with the second internal list, to apply the pending operations to the new write list.

7. The computing device of claim 6, wherein when the write access of the writer process to the linked list is released and the read process is not completed, the computing device sets the updated indicator, and wherein the pending operations are finalized after the read process is completed.

8. The computing device of claim 5, wherein the updated indicator is stored among a plurality of values stored in a head element of the elements of the linked list.

9. The computing device of claim 5, wherein the computing device is configured to modify the updated indicator to indicate that the second internal list is not updated and is not available for swapping with the read list after the second internal list is swapped with the read list.

10. A computer-readable storage medium having stored thereon computer-executable instructions that, when executed on a computing device comprising a processor and a memory, carry out a method for storing in the memory of the computing device a linked list supporting substantially concurrent read and write access, the method comprising:

storing a linked list, the linked list including three internal lists and at least an updated indicator, wherein each element in the linked list includes at least a first link of a plurality of first links, a second link of a plurality of second links, and a third link of a plurality of third links, and a first internal list of the three internal lists comprises elements of the elements of the linked list referenced by the plurality of first links, a second internal list of the three internal lists comprises elements of the elements of the linked list referenced by the plurality of second links, and a third internal list of the three internal lists comprises elements of the elements of the linked list referenced by the plurality of third links;

providing read access to the linked list to a reader process such that the reader process reads elements in the linked list via a read list of the three internal lists, wherein the read list comprises the first internal list;

providing write access to the linked list to a writer process such that the writer process updates the linked list via a write list of the three internal lists, wherein the write list comprises the third internal list;

when the writer process updates the linked list by swapping an updated version of the linked list with the second internal list, setting at least the updated indicator, wherein the updated version of the linked list includes updates to the elements of the linked list provided by the writer process;

deferring updating of the read list to include the updated version of the linked list until the read process is completed, wherein the second internal list is swapped with the read list when the reader process is completed and at least the updated indicator is set, wherein the read access by the reader process and the write access by the writer process occur substantially; and receiving an update instruction from the writer process to further update the linked list according to the update instruction, wherein the writer process updates the linked list by swapping a second updated version of the linked list with the second internal list comprising the updated version of the linked list, and wherein receiving the update instruction from the writer process to update the linked list comprises:

determining whether the updated indicator is set, wherein the set updated indicator indicates that the second internal list is updated and ready for swapping with the read list; and when it is determined that the updated indicator is set and the read process is completed, atomically swapping the read list and the second internal list.

11. The tangible computer-readable storage medium of claim 10, wherein:

when the writer process updates the linked list by swapping the updated version of the linked list with the second internal list, the updates to the elements of the linked list are stored as pending operations and, after the swapping, the write list comprises a new write list, the method further comprising:

determining whether the new write list comprises the read list prior to swapping with the second internal list; and when it is determined that the new write list comprises the read list prior to the swapping with the second internal list, applying the pending operations to the new write list.

12. The tangible computer-readable storage medium of claim 10, wherein the updated indicator is stored among a plurality of values stored in a head element of the elements of the linked list.

* * * * *